A. FLETT.
DETACHABLE RIM DEVICE FOR ROAD VEHICLES.
APPLICATION FILED APR. 26, 1910.
1,003,728.
Patented Sept. 19, 1911.
3 SHEETS—SHEET 1.
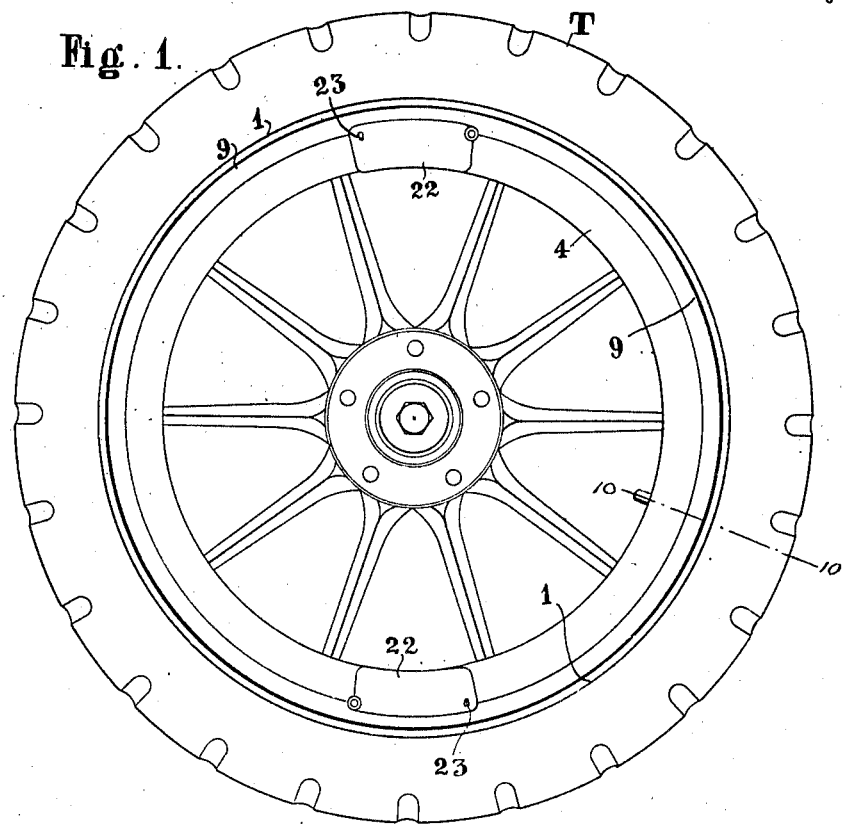
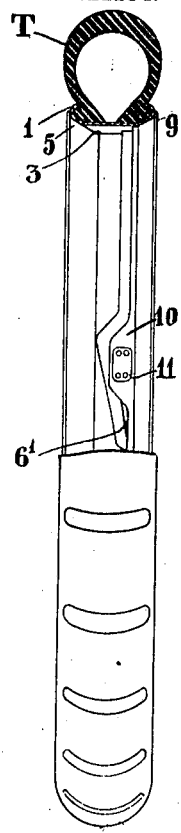
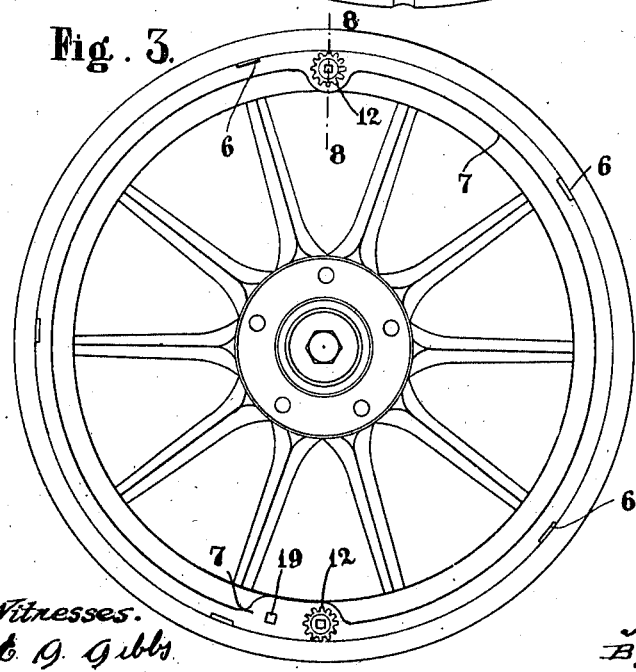
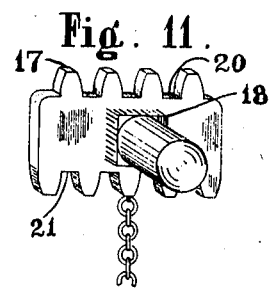
Witnesses.
E. O. Gibbs
G. Manning
Inventor.
Alexander Flett,
By T. Walter Fowler
Atty.

A. FLETT.
DETACHABLE RIM DEVICE FOR ROAD VEHICLES.
APPLICATION FILED APR. 26, 1910.

1,003,728.

Patented Sept. 19, 1911.

3 SHEETS—SHEET 2.

Witnesses.
E. J. Gibbs
G. Manning

Inventor
Alexander Flett,
By J. Walter Fowler,
atty.

A. FLETT.
DETACHABLE RIM DEVICE FOR ROAD VEHICLES.
APPLICATION FILED APR. 26, 1910.
1,003,728.
Patented Sept. 19, 1911.
3 SHEETS—SHEET 3.
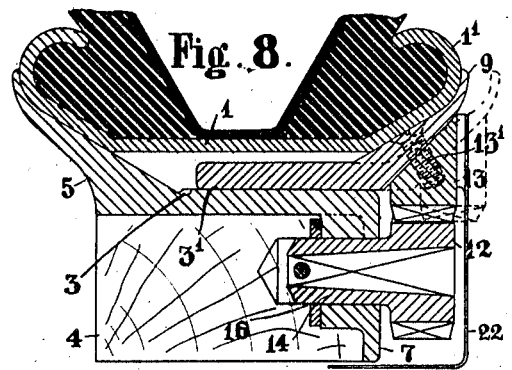
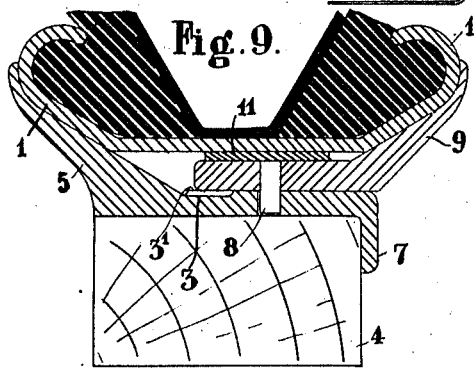
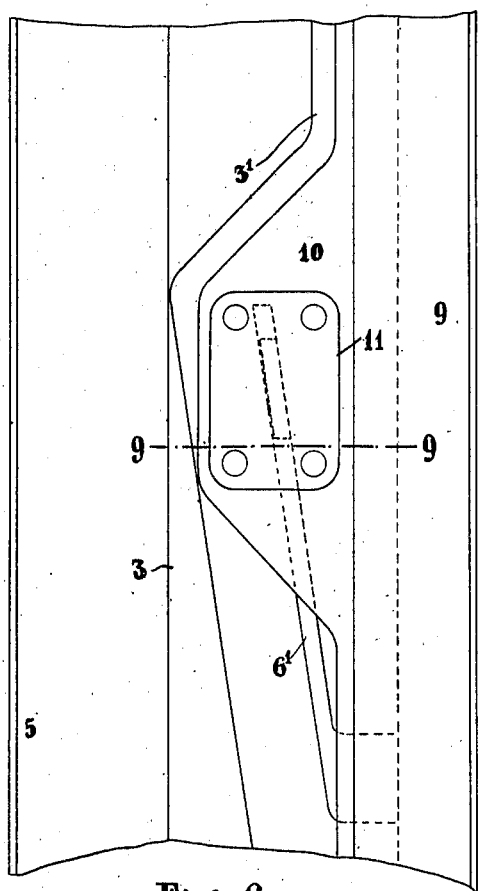
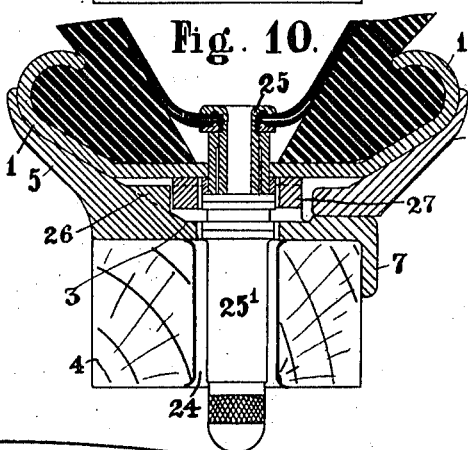
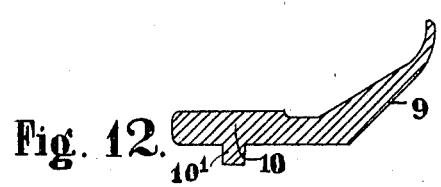
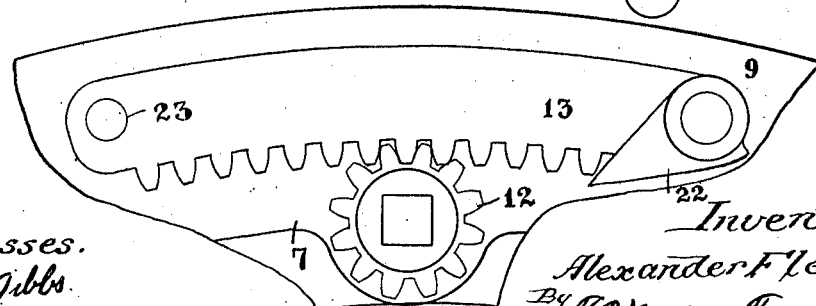
Witnesses.
E. G. Gibbs.
J. Manning.
Inventor,
Alexander Flett.
By J. Walter Fowler
Atty.

UNITED STATES PATENT OFFICE.

ALEXANDER FLETT, OF LONDON, ENGLAND.

DETACHABLE-RIM DEVICE FOR ROAD-VEHICLES.

1,003,728.  Specification of Letters Patent.  Patented Sept. 19, 1911.

Application filed April 26, 1910.  Serial No. 557,768.

*To all whom it may concern:*

Be it known that I, ALEXANDER FLETT, a subject of the King of England, and residing at 86 Upper Tulse Hill, London, England, merchant, have invented certain new and useful Improvements in Detachable-Rim Devices for Road-Vehicles, of which the following is a full, clear, and exact description.

This invention relates to detachable rims for the pneumatic tires of automobiles and the like, of the type in which a tire-carrying rim is held in place between a fixed flange secured to the felly and a loose flange.

According to the present invention, the detachable rim fitted with the tire is clamped at the curved or beveled shoulders of its edges between a fixed flange and a loose flange, which latter is secured by means of a bayonet joint consisting of a number of studs or projections carried by one of the flanges adapted to enter corresponding slots in the other flange; the inner portions of these slots are oblique to the plane of the wheel so as to provide a screw-like grip by the final rotation of the loose flange. This rotation may be effected by one or more pinions engaging internal teeth or racks of short length upon the loose flange.

The annexed drawings illustrate the invention.

Figure 4:
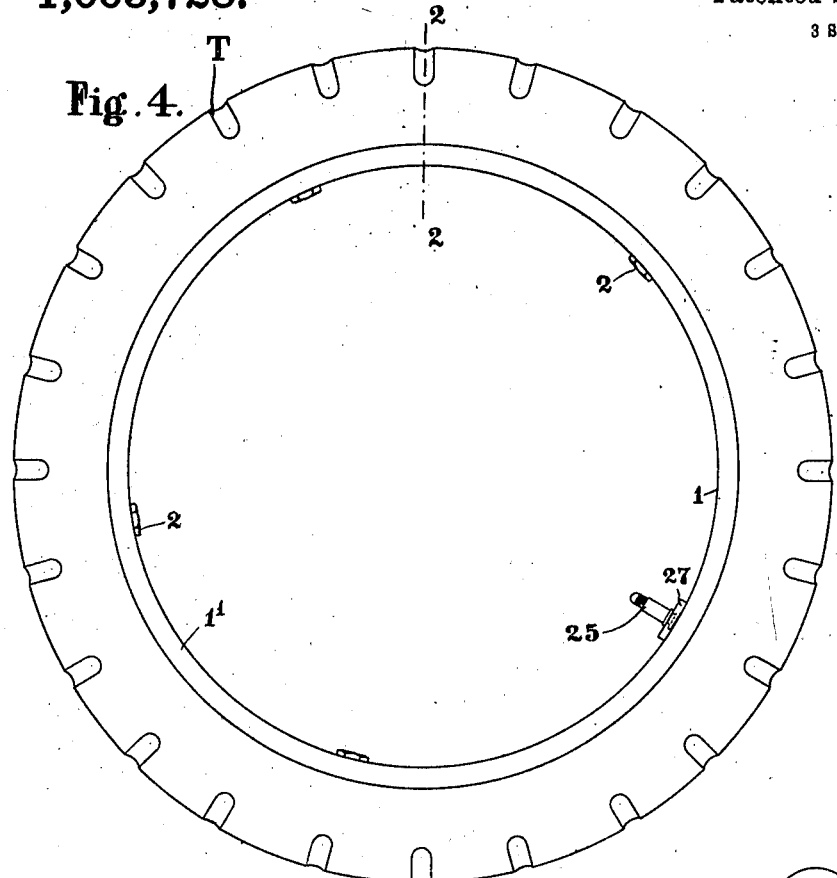
Figure 13:
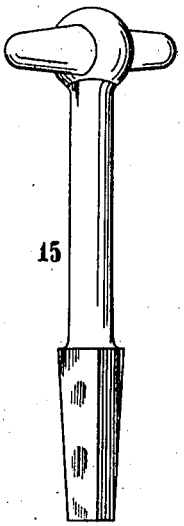
Figure 5:
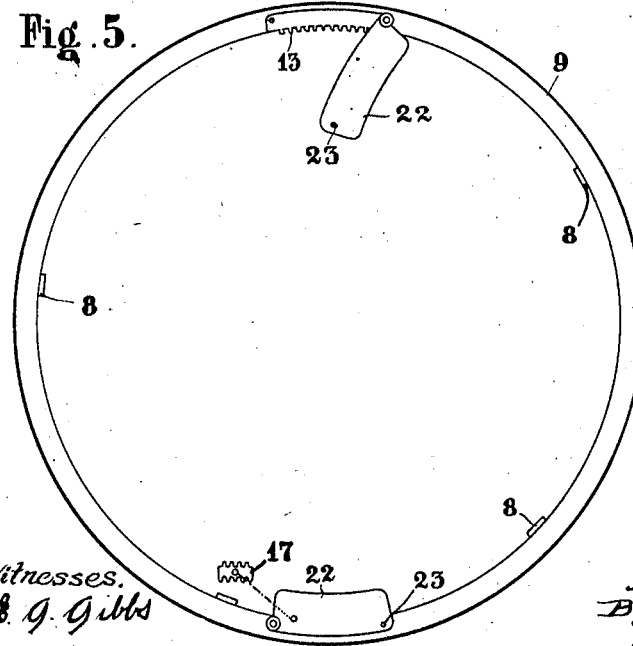
Figure 14:
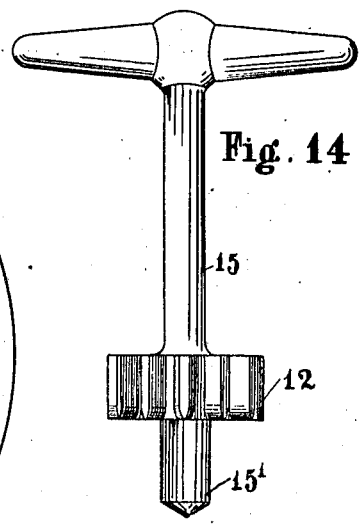

Figure 1 is a front elevation of the complete wheel. Fig. 2 is a side elevation, of which the upper half is a section on line 2—2 of Fig. 4. Fig. 3 is a front elevation of the wheel with the rim detached. Fig. 4 is an elevation of the rim and tire. Fig. 5 is an elevation of the loose flange. Fig. 6 is a detail of Fig. 2 on a larger scale. Fig. 7 is a detail of the operating gear also on a larger scale. Fig. 8 is a cross section likewise on a larger scale, on line 8—8 of Fig. 3, showing the tire and rim in place. Fig. 9 is a section similar to Fig. 8, on line 9—9 of Fig. 6. Fig. 10 is a similar section on line 10—10 of Fig. 1. Fig. 11 is a perspective view of the locking device. Fig. 12 is a cross section of the loose flange according to a modification. Fig. 13 is a view of a suitable key. Fig. 14 is a view of an alternative form of key.

The rim 1 may be of the ordinary clencher form employed for non-detachable rims, but instead of the ordinary security bolts extending inward though the felly, there may be used special security bolts having a very shallow nut 2 on the inner side of the rim in the known manner. Existing detachable rims of this type may therefore be used if necessary, in conjunction with parts constructed in accordance with this invention. The rim 1 is clamped at its curved or beveled edges 1′ between two flanges having seatings of corresponding shape, which are secured together by a bayonet joint. Preferably the slots are in a binding hoop 3 which encircles and is secured to the felly 4 and is formed integral with the inner fixed flange 5. The slots extend partly across this hoop and their inner portions 6′ are inclined at an angle of, for example, five to ten degrees to the plane of the wheel as seen in Figs. 2 and 6. The outer edge of the hoop 3 may be provided with a return flange 7 fitting against the outer side of the felly 4. The projections 8 are preferably carried by the loose flange 9 and may consist of down-turned lips 10′ formed upon a number of lugs 10 on the inner side of the flange as shown in Fig. 12. In the preferred construction, the projections 8 are formed integrally with plates 11 which are riveted upon the outer side of the lugs, the projections themselves passing inwardly through the same. These lugs are adapted to enter between the detachable rim 1 and the binding hoop 3 as seen in Fig. 9. The hoop 3 has a circular facing 3′ upon its outer edge to receive and support the loose flange 9. The loose flange is rotated in either direction as required, by means of one or more pinions 12 mounted on, for example, the return flange 7 of the binding hoop and engaging internal teeth or racks 13 secured to the loose flange 9 by screws 13′. These pinions 12 may be permanently in place as shown in Figs. 3, 7 and 8 with shanks 14 journaled in holes 16 and rotatable by square-ended or other keys 15, or they may be made integral with the keys, as shown in Fig. 14, the latter having suitable shanks 15′ adapted to fit in the holes 16 in the flange and felly.

In order to lock the flange 9 after its adjustment, the rack 13 may be engaged by a toothed plate 17 forming the head of a square or other stem 18 which may be fitted in a hole 19 or one of a number of similar holes in the return flange. The plate may have teeth cut upon two edges 20, 21 or more, in different pitch-relation to allow for fine adjustment. It is to be noted that in the clamping of a rim, which is of a rigid nature but necessarily varies in size to a small extent, it is essential that the method of fixing shall take account of such possible variation in width and in diameter. This is allowed for by the beveled seatings and the margin which is provided by the length of the oblique slots 6 6'. A hinged cover 22 is arranged to inclose the rack and locking plate, and is secured in any convenient manner as by a catch 23. The usual passage 24 is provided through the felly and the binding ring to allow insertion of the tire valve 25 and its cap 25'. The number of bayonet-joint devices will depend upon the size of the tire; preferably they are placed centrally between the security bolts and valve, so that in the case of a tire with four security bolts there will be five bayonet joints. If desired, the rim may be provided with means for engaging the felly or flanges in a positive manner, in order to prevent creeping. For example the binding hoop may be furnished with a number of open-sided bosses 26 into which a special driving lug 27 or the nuts 2 of the security bolts are passed.

The method of operation is the following:—If it is necessary to change a rim by reason of the deflation of the tire or for any other cause, the covers 22 are opened and the keys 15 engaged with the pinions 12. By turning the keys simultaneously in a contra-clockwise direction the loose flange 9 will be rotated and the projections traveling along the oblique parts 6' of the slots 6 will cause the flange 9 to move away from the rim toward the position in dotted lines in Fig. 8. When the projections reach the corners of the slots 6, the flange 9 will be sufficiently free to be pulled away by hand. The rim 1 and the tire T are then removed, the part opposite the valve 25 being taken off first and the valve then lifted out of the hole 24. Another rim 1 carrying a ready inflated tire is next fitted, the valve being first inserted in the hole 24, and the rim then brought into position against the fixed flange 5. After the rim has been pressed into place, the loose flange 9 is placed in position with its projections 8 facing the open ends of the bayonet slots 6, pushed inward until the projections reach the corners of the slots and then rotated in the clockwise direction. This rotation will bring the racks into engagement with the pinions 12, and the loose flange is then tightened by means of the keys. When it is quite secure, the locking plate is inserted in one or other of its positions and finally the covers 22 are closed and fixed.

It will be seen from an examination of the drawings that when a new rim 1 is fitted in place and the rack-provided flange is part rotated, the rim is automatically centered by the action of the bevel seatings afforded by the flanges 5 and 9 and this centering is obtained by the single movement of the flange 9. Further it will be remarked that the bevel seatings exert the centering action equally well upon either a rim 1 with only curved edges or a rim 1 with beveled shoulders, as in the example illustrated.

To facilitate the engagement of the pinions and racks, the sides of the teeth may be beveled in the well known way, as shown in Fig. 14 in the case of the pinion. In the construction, (see Figs. 7 and 8,) the pinions, 12, are secured permanently in place, and if, when the loose flange is fitted their position is such that they do not engage with the racks, then when the loose flange has been partially rotated by hand, the engagement will take place in the direction of the rotation.

In order to prevent the rusting together of the parts of the construction, they are made preferably either entirely or in part of non-rusting metals. For example the rim itself may be made of steel in the usual way and the two flanges or in some cases the loose flange only may be made of suitable non-rusting metal, for example phosphor-bronze or an aluminium alloy of sufficient strength.

Having thus described my invention, what I claim as such and desire to secure by Letters Patent is:—

1. A detachable rim device, comprising a tire-carrying rim, a fixed flange secured upon the wheel, a loose flange, seatings for said rim upon said flanges, said seatings acting to center said rim between said flanges, a bayonet-joint between said flanges, said bayonet joint including slots having inner portions oblique to the plane of the wheel, a curved rack secured upon said loose flange, a pinion adapted to engage said rack, said pinion journaled at a fixed point of the wheel, means for rotating said pinion, means for locking said loose flange at any one of a plurality of positions, said locking means comprising a plate having teeth upon opposite edges and arranged in different pitch-relation and a cover adapted to inclose said rack and locking means, said locking means being attached to said cover.

2. A detachable rim device, comprising a tire-carrying rim, a fixed flange secured upon the wheel, a loose flange, seatings for said rim upon said flanges, said seatings acting to center said rim between said flanges, a bayonet-joint between said flanges, said bayonet-joint including slots having inner portions oblique to the plane of the wheel, a curved rack secured upon said loose flange, a pinion adapted to engage said rack, said pinion journaled at a fixed point of the wheel, means for rotating said pinion, a locking plate, teeth upon edges of said locking plate, said teeth being in graduated pitch-relation and adapted to engage said rack in any one of a plurality of positions of said loose flange, a squared shank to said locking plate, said squared shank adapted to engage with said fixed flange, and a cover adapted to inclose said rack and locking plate, said locking plate being attached to said cover.

3. A detachable rim device, comprising a tire-carrying rim, a fixed flange secured upon the wheel, a loose flange, seatings for said rim upon said flanges, said seatings acting to center said rim between said flanges, a bayonet-joint between said flanges, said bayonet joint including slots having inner portions oblique to the plane of the wheel, curved racks secured upon said loose flange, pinions adapted to engage said racks, said pinions journaled in said fixed flange, means for rotating said pinions in unison, a locking plate, teeth upon edges of said locking plate, said teeth adapted to engage one of said racks in any one of a plurality of positions of said loose flange, a squared shank to said locking plate, said squared shank adapted to engage with said fixed flange, a cover adapted to inclose said rack and locking plate, a chain attaching said locking plate to the inside of said cover, a second cover inclosing another of said curved racks and means for securing said covers in the closed positions.

In testimony whereof I affix my signature in presence of two witnesses.

ALEXANDER FLETT.

Witnesses:
VICTOR F. FEENY,
CYRIL J. FEENY.